United States Patent [19]

Boehmer et al.

[11] Patent Number: 4,967,817
[45] Date of Patent: Nov. 6, 1990

[54] BELTLESS, LOW ASPECT RATIO PNEUMATIC TIRE

[76] Inventors: Ferdinand E. Boehmer, 195 Waverly St., Berea, Ohio 44017; Jolan F. Lobb, 2172 Donner St., NW., North Canton, Ohio 44720; Gene D. Wall, 2273 Smith Rd., Akron, Ohio 44313

[21] Appl. No.: 315,998

[22] Filed: Feb. 27, 1989

[51] Int. Cl.$^5$ ............................................. B60C 3/04
[52] U.S. Cl. ............................. 152/209 R; 152/454; 152/559
[58] Field of Search ............... 152/559, 454, 209 WT, 152/209 R

[56] References Cited

U.S. PATENT DOCUMENTS

| | | | |
|---|---|---|---|
| 2,600,231 | 6/1952 | Ewart | 152/352 |
| 2,869,610 | 1/1959 | Lippmann et al. | 152/559 X |
| 3,517,720 | 6/1970 | Brown | 152/559 X |
| 3,599,695 | 8/1971 | Knight | 152/352 |
| 4,076,066 | 2/1978 | Verdier | 152/354 |
| 4,077,455 | 3/1978 | Curtiss et al. | 152/354 |
| 4,112,994 | 9/1978 | Mills et al. | 152/354 |
| 4,155,392 | 5/1979 | Duderstadt et al. | 152/330 |
| 4,209,050 | 6/1980 | Yoshida et al. | 152/354 |
| 4,232,723 | 11/1980 | Gazuit | 152/350 |
| 4,387,758 | 6/1983 | Matsuda et al. | 152/353 |

FOREIGN PATENT DOCUMENTS

| | | |
|---|---|---|
| 192910 | 9/1986 | European Pat. Off. . |
| 269301 | 6/1988 | European Pat. Off. . |
| 2127588 | 12/1971 | Fed. Rep. of Germany ...... 152/209 WT |

Primary Examiner—John J. Gallagher
Assistant Examiner—Geoffrey L. Knable

[57] ABSTRACT

A pneumatic tire designed for use on paved road or dirt surfaces comprises a pair of annular tensile members, first and second carcass plies, a tread, and a pair of sidewalls extending between each annular tensile member and the tread. The plies from an angle between 20 degrees and 30 degrees with the tire's equatorial plane, the first ply having an substantially equal but opposite orientation from that of the second ply. The tread has a single radius of curvature in the axial direction. The tread radius is within ±2 inches of a radius defined by the following formula:

$$DR = 1747.29 - 337.967(OD) + 16.479 - 8(OD)^2 - 0.0076(AN)^2$$

where DR is the normally inflated design radius in inches of the normally inflated tire, OD is the tire's outside diameter measured in inches, and AN is the cord angle of the carcass plies measured in degrees. The tire has an aspect ratio of less than 50%.

2 Claims, 2 Drawing Sheets

BELTLESS, LOW ASPECT RATIO PNEUMATIC TIRE

BACKGROUND OF THE INVENTION

1. Field of Invention

The present invention relates generally to pneumatic tires and more specifically to tires designed for racing and even more specifically to go-kart racing tires.

2. Description of the Related Art

Tire designers have often varied the aspect ratio of tires to achieve various performance parameters. In high performance tires, and those designed for racing, low aspect ratio tires have been favored. For example, U.S. Pat. No. 4,209,050 discloses a tire for high speed vehicles having an aspect ratio of 0.25 to 0.75 and a carcass construction composed of at least two plies with cords inclined at an angle of 20 degrees to 40 degrees with respect to the equatorial plane of the tire. Additionally, U.S. Pat. No. 4,112,994 discloses a pneumatic tire, particularly a high speed motorcycle tire, which has an aspect ratio of less than 0.65 and carcass plies which form an angle with the equatorial plane of the tire of less than 22 degrees.

In some low aspect ratio tires, a problem called "reverse curvature" was encountered. The term "reverse curvature" refers to the tendency of carcass cords in the crown region of the tire to dip radially inwardly at the equatorial plane. This deformation creates points of inflection which are prone to premature failure. One objective of the current invention is to design a low aspect ratio tire which provides excellent handling and durability, especially for racing purposes, but resists the tendency to exhibit reverse curvature.

SUMMARY OF THE INVENTION

A tire according to the present invention is designed for use on paved or dirt surfaces and has a pair of annular tensile member. A first and second carcass ply each extend between the annular tensile members. Each carcass ply has a central portion and two lateral edge portions. Each lateral edge portion is folded axially and radially outwardly around an annular tensile member. The cords of the central portion of the first carcass ply form an angle between 20 degrees and 30 degrees with the equatorial plane of the tire. The cords of the central portion of the second carcass ply form an angle substantially equal to the angle formed by the cords of the first carcass ply with the equatorial plane but have an orientation with respect to the equatorial plane opposite to that of the central portion of the first carcass ply. A tread extends circumferentially around the carcass plies. The tread is designed with no belt reinforcement and with a single radius of curvature under normal inflation. The tread radius is within +/−2 inches of a radius defined by the following formula:

$$DR = 1747.29 - 337.967(OD) + 16.4798(OD)^2 - 0.0076(AN)^2$$

where Dr is the design radius of the normally inflated tire measured in inches, OD is the normally inflated tire's outside diameter when measured in inches, AN is the cord angle of the first carcass ply measured in degrees, and the normal inflation pressure is 15 to 30 psi. The normally inflated tire of the invention has an aspect ratio less than 50%.

BRIEF DESCRIPTION OF THE DRAWINGS

Other aspects of the invention will become apparent from the following description when read in conjunction with the accompanying drawings wherein.

DETAILED DESCRIPTION OF THE PREFERRED EMBODIMENT

Figure 1:
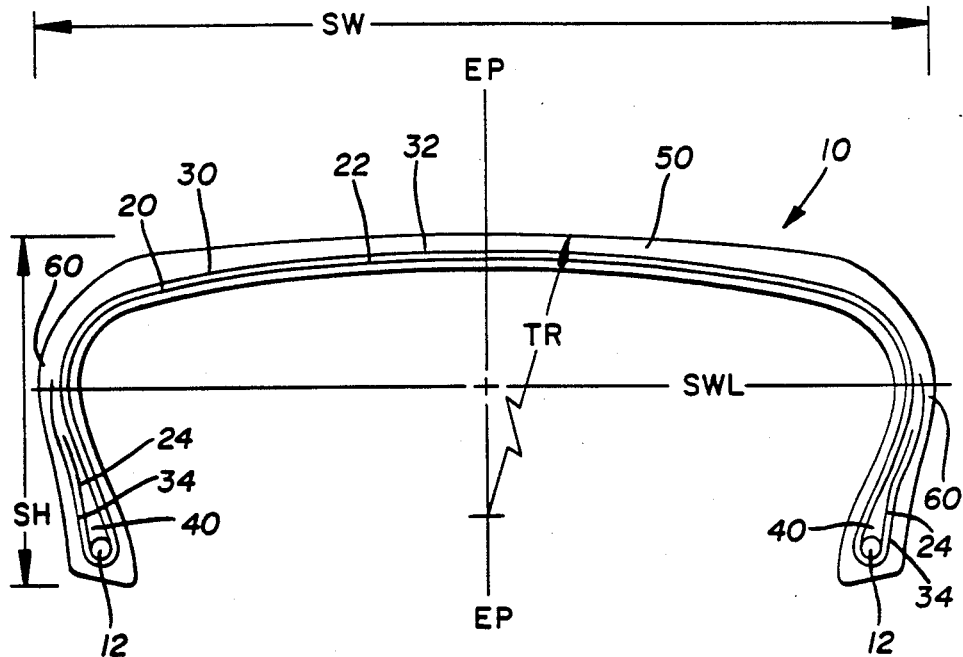
FIG. 1 is a radial cross-sectional view of a tire according to the present invention.

The invention also may be better understood in the context of the following definitions, which are applicable to both the specification and the appended claims.

"Aspect ratio" of the tire means the ratio of its section height to its section width.

"Axial" and 37 axially" are used herein to refer to lines or directions that are parallel to the axis of rotation of the tire.

37 Bead" means that part of the tire comprising an annular tensile member wrapped by ply cords and shaped, with or without other reinforcement elements.

37 Carcass" means the tire structure apart from the belt structure, tread, undertread, and sidewall rubber over the plies, but including the beads.

37 Cord" means one of the reinforcement strands of which the plies in the tire are comprised.

37 Cord Angle" means the acute angle, left or right in a plan view of the tire, formed by a cord with respect to the equatorial plane.

"Design radius" means the radius of the normally inflated tire which describes all of a portion of the tread's intended curvature in the axial direction, that is, in a plane passing through the axis of rotation of the tire. The design radius may differ from the actual, as-built tread radius due to production tolerances and other variances.

37 Design inflation pressure" means the inflation pressure or range of inflation pressure recommended by the tire's manufacturer for operation of the tire on a vehicle.

37 Equatorial plane (EP)" means the plane perpendicular to the tire's axis of rotation and passing through the center of its tread.

37 Inflection point" means a point in a curved path at which its direction of curvature changes, that is, the center of curvature shifts from one side of the path to the other. An example of an inflection point is the center of the letter "S".

37 Ply", unless otherwise specified, means a continuous layer of rubber-coated parallel cords.

37 Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and, by virtue of its ply cords that create a tensile structure, contains the fluid that sustains the vehicle load.

37 Radial" and 37 radially" are used to mean directions radially toward or away from the axis of rotation of the tire.

37 Section height" means the radial distance from the nominal rim diameter to the outer diameter of the tire at its equatorial plane.

37 Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

37 Section Width Line (SWL)" means a line parallel in the cross-section of the tire to its axis of rotation and which is located at the tire's point of maximum axial width, i.e., at the location at which the tire's section width is measured.

37 Sidewall" means that portion of a tire between the tread and the bead.

37 Tread" means that portion of a tire that comes into contact with the road when the tire is normally inflated and under normal load.

37 Tread radius" means the radius of the normally inflated tire which describes all or a portion of the tread's actual curvature in the axial direction, that is, in a plane passing through the axis of rotation of the tire.

37 Tread width" means the arc length of the tread surface in the axial direction, that is, in a plane passing through the axis of rotation of the tire.

Where the tire is stated to be normally inflated means that the tire is inflated to the design inflation pressure.

In the drawings, the same numerals are used for the same components or items in the several views. With particular reference now to FIG. 1, there is illustrated a pneumatic tire 10.

The tire 10 has a pair of axially spaced apart annular tensile members 12.

Figure 3:
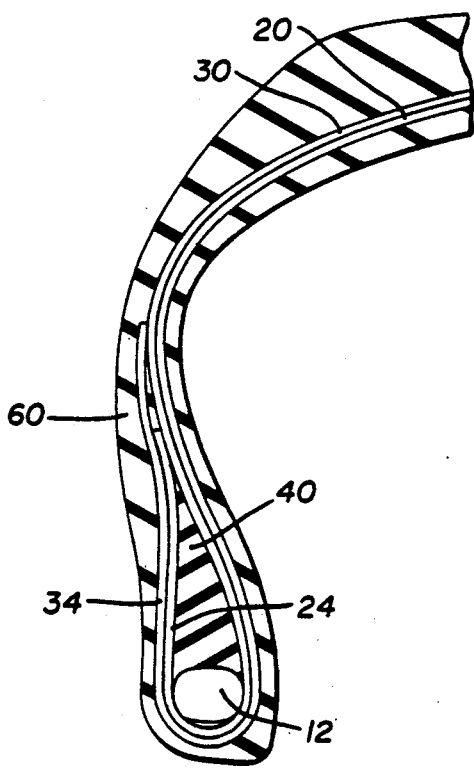
FIG. 3 is an enlarged sectional view of the bead area of a tire according to the present invention.
Figure 2:
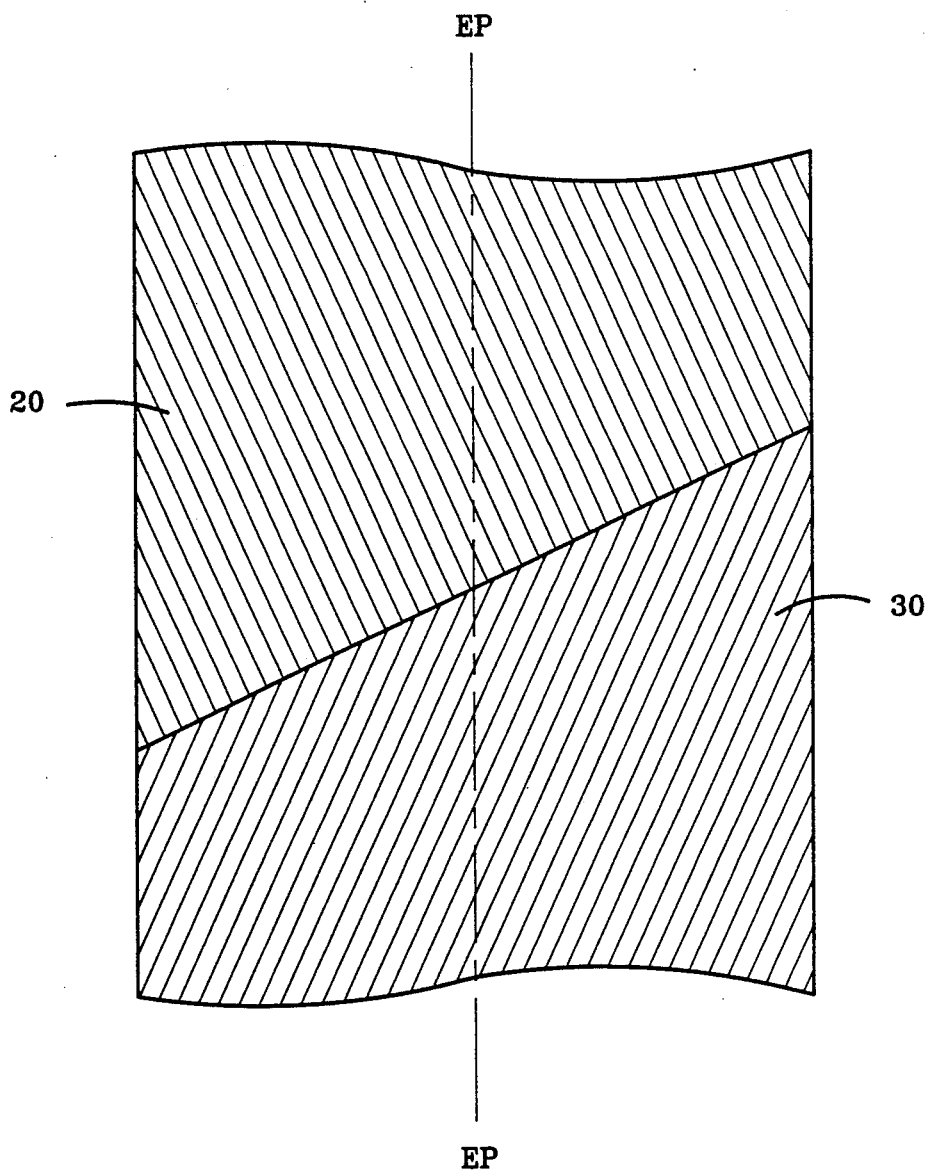
FIG. 2 is a plan view of a tire according to the present invention with the tread removed so that the angle of the carcass cords is visible.

Each of the first and second carcass plies 20,30 has a central portion 22,32 extending between the annular tensile members 12. As seen in FIG. 3, each carcass ply also has lateral edge portions 24,34 which are folded axially and radially outwardly around an annular tensile member. The carcass plies are preferably reinforced with cords made of nylon, although it is believed that other carcass reinforcing materials would be suitable. Nylon is preferred because of its resistance to elongation at elevated temperatures, such as those associated with racing. As seen in FIG. 2, the cords may form an angle between 20 degrees and 30 degrees with the tire's equatorial plane. In the preferred embodiment, the cords form an angle of 25 degrees.

An apex strip 40 may be disposed between each annular tensile member 12 and the central portion 22,32 and lateral edge portions 24,34 of the second carcass ply 30. In the preferred embodiment, an apex strip is used.

A tread 50 extends circumferentially around the carcass plies 20,30. The tread can be grooved with an appropriate tread pattern if desired. In the preferred embodiment, the tread is not grooved. As seen best in FIG. 1, the tread has a single radius of curvature TR in the axial direction. In a tire according to the present invention, when operated at inflation pressures between 15 psi and 30 psi, the tread exhibits no reverse curvature and there are no inflection points along the tread radius. In contrast, treads of aspect ratios below 50% and of cord angles between 20 and 25 degrees commonly exhibit reverse curvature.

This is an important aspect of the invention. The single radius of tread curvature helps make the tire molds easier to design and less expensive and reduces stress in the tire. The low aspect ratio has proven helpful in supplying the good handling characteristics necessary for racing or high performance applications. The cord angle range specified, 20 degrees to 30 degrees, has been chosen to provide certain handling characteristics. At the preferred cord angle, 25 degrees, and below, the problem of reverse curvature is prone to develop. The resulting points of inflection create areas prone to cord failure and unsatisfactory tire performance. Reverse curvature causes portions of the tread to be stressed more heavily than others because the tread is not flat.

A tire according to the invention has demonstrated improved performance and success in racing due to uniform pressure distribution in the footprint. This success is attributed in large measure to the tread radius and resulting mold shape.

The tread radius of a tire according to the invention is defined by the following formula:

$$DR = 1747.29 - 337.967(OD) + 16.4798(OD)^2 - 0.0076(AN)^2$$

where DR is the normally inflated tire's design radius measured in inches, OD is the normally inflated tire's outside diameter measured in inches and AN is the cord angle of the carcass plies measured in degrees. The above equation is valid for tire outside diameters between 8 and 14 inches and for carcass cord angles between 20 and 30 degrees. Due to 37 real world" production environment, variations in tread radius of up to $+/-2$ inches were observed in one embodiment of the invention. In the preferred embodiment, the tread radius is 11 inches.

A pair of sidewalls 60 extend between each annular tensile member 12 and the tread 50. The height of the sidewalls 60 is such that the tire's section height SH divided by its section width SW, or aspect ratio, is less than 50%. In the preferred embodiment, the tire's aspect ratio is 43%.

In order to achieve a flat tread and the performance advantages associated therewith, tire designers sometime use a belt reinforcing structure disposed between the carcass plies 20,30 and the tread 50. The belt reinforcing structure acts to restrain the tire during high speed operation and contributes to a flat tread. The belts are generally reinforced with cord and add to the cost of the tire. Tire failures often originate at the edges of such belts. In the preferred embodiment of a tire according to the invention, no belts are used. The combination of tread radius, cord angle, and inflation pressure enables the subject invention to operate successfully and avoid the problems of reverse curvature without the need for a belt reinforcing structure. This results in material and cost savings as well as a cooler-running, more durable tire.

Based on the foregoing description of the invention, what is claimed is:

1. A pneumatic tire designed for use on paved road or dirt surfaces, the tire comprising:
a pair of annular tensile members;
a first and a second carcass ply each extending between the annular tensile members, each carcass ply having a central portion and two lateral edge portions, each lateral edge portion being folded axially and radially outwardly around an annular tensile member, the cords of the central portion of the first carcass ply forming an angle in the range between 20° and 30° with the equatorial plane, the cords of the central portion of the second carcass ply forming an angle in such range substantially equal to the angle formed by the cords of the first carcass ply with the equatorial plane but having an orientation with respect to the equatorial plane opposite to that of the first carcass ply;

a tread extending circumferentially around the carcass plies, the tread being designed with no belt reinforcement and with a single radius of curvature under normal inflation, the radius being within $+/-2$ inches of a radius defined by the following formula:

$$DR = 1747.29 - 337.967(OD) + 16.4798(OD)^2 - 0.0076(AN)^2$$

where DR is the normally inflated tire's design radius measured in inches, OD is the normally inflated tire's outside diameter measured in inches, AN is the cord angle of the first carcass ply measured in degrees, and the normal inflation pressure is 15 to 30 psi; and the normally inflated tire having an aspect ratio less than 50 percent.

2. A pneumatic tire as in claim 1 wherein the tire's outside diameter is between 8 inches and 14 inches.

* * * * *